United States Patent [19]

Bowen

[11] Patent Number: 4,893,841
[45] Date of Patent: Jan. 16, 1990

[54] REAMER GUIDE FOR PRIMARY SEWER LINE TAPS

[76] Inventor: William D. Bowen, 123 S. W. 87, Oklahoma City, Okla. 73139

[21] Appl. No.: 340,836

[22] Filed: Apr. 20, 1989

[51] Int. Cl.$^4$ ............................................. F16L 55/18
[52] U.S. Cl. ..................................... 285/15; 285/55; 285/93; 285/156; 285/423
[58] Field of Search ................... 285/156, 55, 93, 197, 285/198, 423, 199, 369, 15, 155; 137/317, 318, 319

[56] References Cited

U.S. PATENT DOCUMENTS

| | | | |
|---|---|---|---|
| 266,809 | 10/1982 | Greenleaf | 285/156 X |
| 582,258 | 5/1987 | Brighton et al. | 285/156 X |
| 2,239,651 | 4/1941 | McMurray et al. | 285/197 |
| 3,347,568 | 10/1967 | Weeden et al. | 285/55 |
| 3,376,412 | 5/1945 | Arthur | 285/156 X |

FOREIGN PATENT DOCUMENTS 2532233 1/1976 Fed. Rep. of Germany ........ 285/55
6606563 11/1967 Netherlands ........................ 285/155

Primary Examiner—Dave W. Arola
Attorney, Agent, or Firm—Robert K. Rhea

[57] ABSTRACT

In a primary sanitary sewer line having at least one lateral secondary sewer line connected therewith and having the bore of the primary line sealed by an impervious plastic liner tube, a sleeve is inserted into the end portion of the lateral line at its connection with the primary line prior to the installation of the liner tube and abuts and is sealed with the wall of the liner tube in a manner permitting visual indentification, from within the liner tube, of the exact position of the lateral line connection with the primary line whereby, using the inner wall surface of the sleeve, that portion of the plastic liner tube wall covering the adjacent end of the sleeve may be reamed out of the sleeve without damage to the primary or secondary sewer lines.

2 Claims, 1 Drawing Sheet

REAMER GUIDE FOR PRIMARY SEWER LINE TAPS

BACKGROUND OF THE INVENTION

1. Field of the Invention

The present invention relates to sanitary drain lines and more particularly to a reamer guide for reopening the repair liner sealed terminal end of a lateral drain connected with a main or primary sewer drain.

2. Description of the Prior Art

It is presently common practice to recondition worn sanitary primary drain lines by installing a plastic liner. This liner is closed end tube-like in general form and is inserted at an uphill or elevated portion of the primary line with water being added to the elongated liner which aids in moving the liner longitudinally throughout a selected length of the line, for example, a city block or at least several hundred feet. After a selected distance or length of the flexible liner has been installed in the primary line, the tube is filled with water, at approximately 1300° F., which expands it against the wall forming inside diameter or cylindrical bore of the primary drain line. This water is circulated until the plastic material liner sets and hardens. Thereafter, the water is drained from the main line and since the liner seals off all sewer lateral lines connected to the main line, these must be opened. The lateral lines normally are connected with a tee portion inserted or interposed in the main line with the lateral or bullhead connection of the tee facing vertically upward.

A remotely controlled motor driven reamer, including a camera, is progressively moved into the main or primary line and as each of the lateral line connections is located, the reamer is elevated to enter the bore of the lateral line and penetrate the liner. The reamer is rotated by the motor to open the line, however, if the placement of the reamer is not accurate, the reamer damages or even penetrates the wall of the primary line and/or the tee connection with the lateral line.

This invention provides a metallic sleeve which, when installed in the lateral line, at its end portion connected with the primary line, forms a guide for the reamer in opening or cutting an opening through the liner closing the end portion of the lateral line communicating with the primary line.

SUMMARY OF THE INVENTION

In a primary drain line having a generally cylindrical bore and having a tee interposed in the line forms a continuation of the cylindrical bore with the tee lateral opening disposed upwardly for connection with the terminal or exhaust end portion of a lateral drain line.

A liner means, comprising a sleeve, preferably formed from metallic material, having a length at least equal to its dimeter, is interposed in the lateral drain line exhaust end portion and with the inwardly directed end of the sleeve intersecting the cylindrical plane defined by the bore of the main line.

The principal object of this invention is to provide a liner for protecting the wall forming the bore of the terminal end portion of a lateral line connected with a primary sanitary sewer line which permits reaming out that portion of a liner refurbishing the bore of the main line and temporarily closing the exhaust end of a lateral line without damage to the wall of the main line or its connection with the lateral drain line.

DESCRIPTION OF THE PREFERRED EMBODIMENTS

Figure 1:
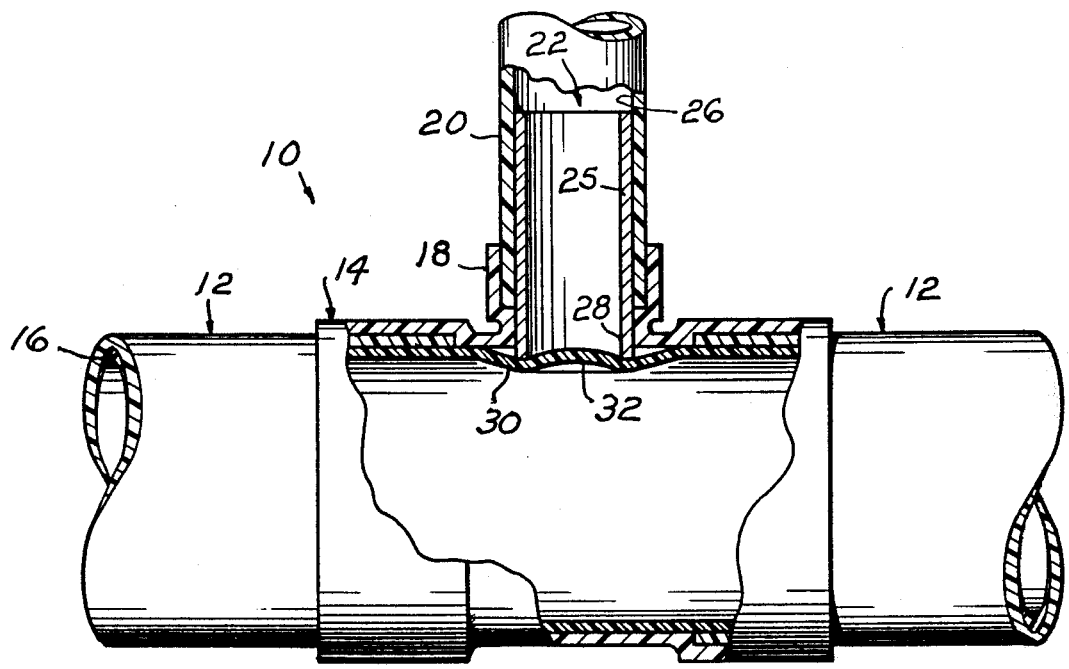
FIG. 1 is a fragmentary elevational view illustrating a primary drain line connected with a fragment of the terminal end portion of a lateral line, portions being broken away and sectioned for clarity; and, FIG. 2 is a fragmentary vertical cross sectional view, to an enlarged scale, illustrating the position of the repair liner following the reaming action opening the lateral line to the main line.
Figure 2:
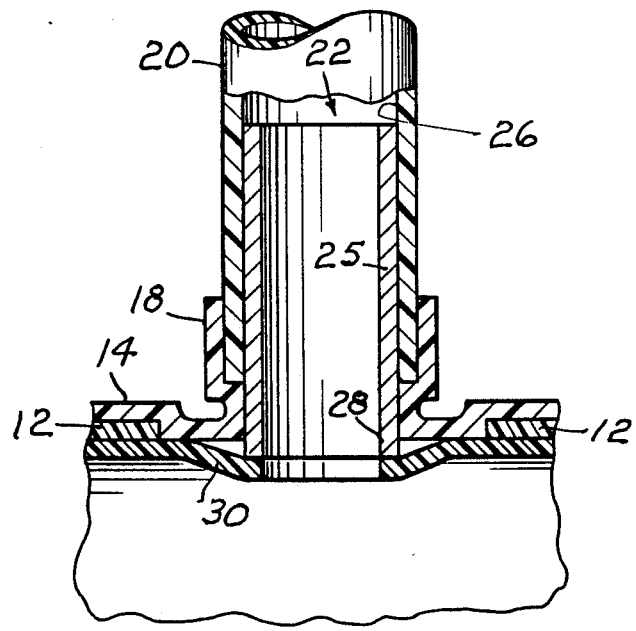

Like characters of reference designate like parts in those figures of the drawings in which they occur.

In the drawings:

The reference numeral 10 indicates a fragmentary portion of a primary or main sanitary sewer line formed by a plurality of pipe joints 12, only two being shown. A tee 14 is interposed between the joints 12, at selected locations, and forms a continuation of the generally cylindrical internal bore 16 of the main line 10. The lateral opening 18 of the tee is disposed vertically upward which cooperatively receives the lateral line terminal end portion 20. The above description is substantially conventional with sanitary sewer lines and is set forth to show the combination with which the present invention is used.

The device indicated, at 22, primarily comprises a sleeve means 25, preferably formed from metallic material, which is substantially equal diametrically to the bore 26 of the lateral line 20 and, when installed therein with its inwardly directed end portion 28 intersecting a portion of the cylindrical plane defined by the main bore line 16, provides a protection for the wall forming the bore of the lateral drain line 20.

In practice, as mentioned hereinabove in the prior art description, a plastic liner 30 is installed in the bore of the main line 10 and, when in contact with the inward end portion 28 of the sleeve means 25, forms a circular protrusion extending into the bore of the main line with the central portion of the protrusion being concave, as at 32. This concave surface 32 or indentation is easily identified by a remotely controlled motor driven reamer and television camera, not shown, which is progressively moved through the bore of the main line following hardening of the liner material 30.

When one of the lateral drain line terminal end portions 20 is located, the reamer is elevated until it penetrates the plastic liner 30 in the position of the dimple or concave recess 32. The metallic inner wall surface of the sleeve means 25 then guides the reamer in cutting out or severing that portion of the liner material 30 within the bore of the sleeve means and reestablishes an inline connection between the main line and the lateral line which is not likely to form an obstruction by hindering fluid and waste material flowing from the lateral line into the main line at the lateral connection.

Obviously the invention is susceptible to changes or alterations without defeating its practicability. Therefore, I do not wish to be confined to the preferred embodiment shown in the drawings and described herein.

I claim:

1. In a subterranean liquid and waste primary drain line having a cylindrical bore and having a tee interposed in the line and cooperatively forming a continuation of the cylindrical bore with the lateral opening of the tee connected in communicating relation with the discharge end portion of a lateral secondary drain line and having the surface defining its cylindrical bore imperviously sealed by a the wall of a plastic material tube, the improvement comprising:
- a sleeve contained by the lateral line in its end portion connected with the tee,
  - said sleeve having one of its end surfaces abutting and closed by the wall of the liner tube.

2. The combination according to claim 1 in which said sleeve is right circular cylindrical and diametrically opposite upstream and downstream circumferential portions of the sleeve said one end surface respectively subtend an arc of the circumference of the liner tube for providing visual identification, within the liner tube, of the position of the lateral line connection with the primary drain line.

* * * * *